United States Patent
Ohnishi et al.

(10) Patent No.: US 6,178,615 B1
(45) Date of Patent: Jan. 30, 2001

(54) METHOD FOR SEQUENTIALLY FEEDING AND AUTOMATICALLY MACHINING LONG LENGTH ARTICLES

(75) Inventors: Shinobu Ohnishi, 1-2, Furuta 3-chome, Harima-cho, Kako-gun, Hyogo 675-01 (JP); Yasuhiro Miya, Hyogo (JP)

(73) Assignee: Shinobu Ohnishi, Hyogo (JP)

( * ) Notice: Under 35 U.S.C. 154(b), the term of this patent shall be extended for 0 days.

(21) Appl. No.: 09/421,319

(22) Filed: Oct. 18, 1999

Related U.S. Application Data

(62) Division of application No. 08/983,109, filed on Jul. 27, 1998, now Pat. No. 5,966,798.

(30) Foreign Application Priority Data

Nov. 14, 1994 (JP) .................................................. 6-305569

(51) Int. Cl.[7] .............................. B23Q 7/00; B23B 35/00; B23C 1/00
(52) U.S. Cl. .............................. 29/558; 82/1.11; 408/1 R; 409/131
(58) Field of Search ............................ 29/558, 559, 563, 29/564, 33 P, 26 A; 82/1.11, 124; 409/131, 132, 148, 149, 157, 158, 159; 198/345.3, 346.1; 408/42, 43, 1 R; 266/48

(56) References Cited

U.S. PATENT DOCUMENTS

| | | | | |
|---|---|---|---|---|
| 2,542,986 | * | 2/1951 | Bonen | 405/155 |
| 4,783,889 | * | 11/1988 | Hayashi | 29/33 P |
| 4,796,341 | * | 1/1989 | Kulta, II | 29/563 |
| 4,944,335 | * | 7/1990 | Luyten | 29/33 P X |
| 4,946,021 | * | 8/1990 | Murphy | 29/33 P |
| 5,368,538 | * | 11/1994 | Pedringhause et al. | 29/26 A |
| 5,379,510 | * | 1/1995 | Berge | 29/564 |

FOREIGN PATENT DOCUMENTS

| | | | |
|---|---|---|---|
| 54-351 | * | 1/1979 | (JP) . |
| 54-126188 | * | 9/1979 | (JP) . |
| 56-142922 | * | 10/1981 | (JP) . |
| 62-128059 | * | 8/1987 | (JP) . |
| 1-264715 | * | 10/1989 | (JP) . |
| 4-35834 | * | 3/1992 | (JP) . |

* cited by examiner

*Primary Examiner*—William Briggs
(74) *Attorney, Agent, or Firm*—Smith Patent Office

(57) ABSTRACT

A long length product is conveyed along a conveyor by a propulsion mechanism into contact therewith. The product is gripped by a first conveyor line vise and cut at its tailing end side to a specified dimension. The product is advanced by the propulsion mechanism against the conveying force of the conveyor and then gripped by the first conveyor line vise and machined. A series of these operations are iterated. Finally, the product is advanced to a second conveyor line, where it is gripped by a second conveyor line vise and subjected to final machining with the propulsion mechanism retracted. Instead of using a process of cutting to cut the leading end side of the product to a specified dimension, the leading end side of the product may be put into contact with the stopper and fed by referencing the leading end of the product.

4 Claims, 7 Drawing Sheets

METHOD FOR SEQUENTIALLY FEEDING AND AUTOMATICALLY MACHINING LONG LENGTH ARTICLES

This application is a divisional application of application Ser. No. 08/983,109 filed on Jul. 27, 1998 U.S. Pat. No. 5,966,798.

BACKGROUND OF THE INVENTION

1. Field of the Invention

The present invention relates to a method and apparatus for sequentially feeding and automatically machining products having a long length. More specifically, the invention relates to a method and apparatus by which various articles, especially long products, can be automatically machined in sequence to perform cutting, boring, end-notching, welding, or other machining processes at preset sites on the product, while the product is being advanced in the longitudinal direction.

2. Discussion of the Related Art

Steel materials such as shaped steel is often used as a structural material or the like. Generally, these types of steel materials are in many cases, transported and carried in containing a length that is longer than necessary from the manufacturers. Therefore, it is common practice that the longer length steel materials are cut into necessary lengths by using torches or the like. Thereafter they are notched at their end portions of each steel piece, followed by machining processes such as boring at necessary locations.

However, since conventional approaches for machining have all been manual work, poor workability and longer working time are involved thereby increasing the cost.

It is an object of the present invention to provide a method for sequentially feeding and automatically machining long length articles or products such as shaped steel, such that the product is automatically fed and machined for cutting into required dimensions, boring, end-processing, or other machining processes in sequence.

SUMMARY OF THE INVENTION

The method for sequentially feeding and automatically machining long length products comprises a leading-end machining step, an intermediate machining step, and a final machining step. The first and second conveyor lines each have a vise in proximity to a machining area and are provided on both sides of the machining area so that the products are successively and automatically machined at preset sites, while being advanced on the conveyor lines by a propulsion mechanism. The leading-end machining step is a step for moving the propulsion mechanism to a preset initial position on the first conveyor line, and then transferring the product toward the propulsion mechanism located on the first conveyor line. In this state, the product is gripped by the first conveyor line vise and a leading end side of the product is cut to a specified dimension. The intermediate machining step is a step releasing the product from the vise and advancing the product to a preset distance by the propulsion mechanism against a conveying force of the first conveyor line so that the machined part of the product is fed to the second conveyor line while a to be machined target site of the product is set within the machining area. In this state, the unmachined part of the product is gripped by the first conveyor line vise and a preset machining process is carried out on the to be machined target site. Further iteration then occurs for a series of the above described operations and for a preset number of times.

The final machining step feeds the tailing end of the product into the machining area by the propulsion mechanism against a conveying force from the second conveyor line. Thereafter the product is gripped by the second conveyor line vise and with the propulsion mechanism having retreated, the apparatus carries out a preset final machining process.

Generally, long length products are often provided in sizes a little larger than their specified dimensions. since the product is typically advanced by referencing the tailing end of the product, this would adversely affect the advancing precision such that positioning precision for the machining target sites of the product could not be attained. Accordingly, advancing the product by referencing the leading end of the product makes it possible to set even shorter than specified product into machining positions with high precision except for the machining of the tailing end.

Accordingly, a method for sequentially feeding and automatically machining long length products according to the present invention comprises an initial position setting step instead of the aforementioned leading end machining step. The initial position setting step is for transferring the product by the conveyor lines toward the propulsion mechanism located on the first conveyor line until the product comes into contact therewith. Thereafter a stopper is made to protrude into the machining area, and the product is advanced by the propulsion mechanism against the conveying force of the first conveyor line until the product comes into contact with the stopper so as to plunge the stopper. In this state, the resulting position of the propulsion mechanism is taken as an initial position.

The product may be any long material without any particular limitations as to shape, and applicable to, for example, the machining of shaped steel. The type of machining may be any one of various machining processes, including cutting, boring, notching, welding, and the like.

Further, according to the present invention, there can be provided an apparatus for sequentially and automatically machining a long length product at preset sites thereof after longitudinally advancing and then stopping the product. The apparatus comprises first and second conveyor lines made from roller conveyors and provided on both sides of a machining area. The conveyors are capable of conveying the product in a forward direction and its reverse direction. The apparatus also includes a propulsion mechanism provided on the first conveyor line on the product feed side so as to contact the tailing end of the product and having enough propulsive force to advance the product forward toward the machining area against the conveying force of the conveyor line. First and second vises are also provided in proximity to the machining area of the first and second conveyor lines and they are able to grip the product. Further, a machining apparatus is provided in proximity to the machining area and is capable of carrying out a plurality of different types of machining processes of the product. The apparatus also includes a controller which is capable of setting in advance the distance corresponding to a plurality of to be machined target sites on the product and the types of machining processes for the individual target sites. The controller can also drive and control the first and second conveyor lines, the propulsion mechanism, the first and second vises, and the machining apparatus.

The reason that the conveyor lines are made from roller conveyors is to advance. the product smoothly against the conveying force of the conveyor lines. The rollers of the conveyor lines may be operated either in a way that all the rollers are driven or in a way that part of them are driven with the remaining rollers being free.

Generally, when the product is machined on the conveyor lines, the product needs to be positioned not only in the longitudinal direction but also in the widthwise direction. The longitudinal positioning can be achieved by starting to feed the product from a correct initial position and then controlling the feed distance with a high precision. The widthwise positioning can be achieved by aligning the product widthwise with the use of a widthwise adjustment mechanism comprising a pair of pinching members and a drive mechanism. For example, the adjustment mechanism can include a combination of an air cylinder, a hydraulic cylinder, a motor, and a feed screw mechanism. In this arrangement, if the roller conveyor line is tilted widthwise, the product placed on the line will move downward from the tilt by its own weight, so that the product can be widthwise aligned and positioned naturally. This arrangement allows the construction of the apparatus to be simplified greatly.

The propulsion mechanism may be a system incorporating a rack and pinion or ball and screw or other like propelling means, which however would involve complex construction arrangements as well as increased cost. Therefore, it is preferable to use a drive motor and chains as the propelling means. Favorably, the propulsion mechanism may contain a shock absorber mechanism capable of absorbing shocks due to contact with the product.

The machining apparatus may be any one that can selectively perform a plurality of different types of machining processes. For example, the machining apparatus may be one which is provided with a plurality of machining tools such as a gas cutting torch, drill, and welding torch, and it can select one of them. However in terms of working efficiency and space, the machining apparatus is preferably a machining robot that has a plasma torch and that can move in three (XYZ) directions.

The controller is implemented by a microcomputer, computer, sequencer, or the like. It is necessary for the controller to be able to set machining conditions according to the product as required.

In order to allow the product to be sequentially fed and machined by referencing the leading end of the product, a stopper is provided that can emerge and be plunged in the machining area. The controller has the function of controlling and sensing the position of the stopper.

With the long length products placed on the conveyor line, the first and second conveyor lines convey the product backward or forward toward the propulsion mechanism until the tailing end of the product is brought into contact with the propulsion mechanism previously set to an initial position and thus it is positioned. Then, the product is gripped by the first conveyor line vise, and cut by the leading end side by the machining apparatus. This results in a product having a specified dimension.

After cutting the product to the specified dimension, the vise is opened and the product is advanced by the propulsion mechanism against the conveying force of the first conveyor line. During this process, since the product is normally kept in contact with the propulsion mechanism by virtue of the conveying force of the conveyor line, the product can be advanced and positioned with a high precision by correctly controlling the feed of the propulsion mechanism. The product is then advanced by a preset distance so that the machined portion of the product is fed toward the second conveyor line, while the to be machined target site of the product is moved within the machining area. At this point, the propulsion is stopped, and the long length product is gripped by the first conveyor line vise and subjected to the preset machining process by the machining apparatus.

After this, the operations of opening the vise, advancing and stopping, gripping by the vise, and machining occur. Upon reaching the final machining process, the product is fed to the second conveyor line side by the propulsion mechanism so that the tailing end of the product is fed into the machining area. With the propulsion mechanism stopped, the product is then gripped by the second conveyor line vise. Then after the propulsion mechanism retreats the final machining is carried out.

In the case where the machining process is carried out by referencing the leading end of the product without setting the initial position of the propulsion mechanism, after the product comes into contact with the propulsion mechanism, the stopper protrudes into the machining area and then the propulsion mechanism is advanced so that the product comes into contact with the stopper. This is where the then resulting product leading end position is taken as the initial position. From this point on, the intermediate machining processes and the tail end machining processes are carried out in the same manner as described above. With a product shorter than the specified dimension the final machining processes may result in a fault but the intermediate machining processes can be carried out as previously set.

BRIEF DESCRIPTION OF THE DRAWINGS

The above and other objects and features of the present invention will be clearly understood from the following description with respect to preferred embodiment thereof when considered in conjunction with the accompanying drawings, wherein the same reference numerals have been used to denote the same or similar parts or elements, and in which.

DETAILED DESCRIPTION OF THE PREFERRED EMBODIMENTS

Figure 1:
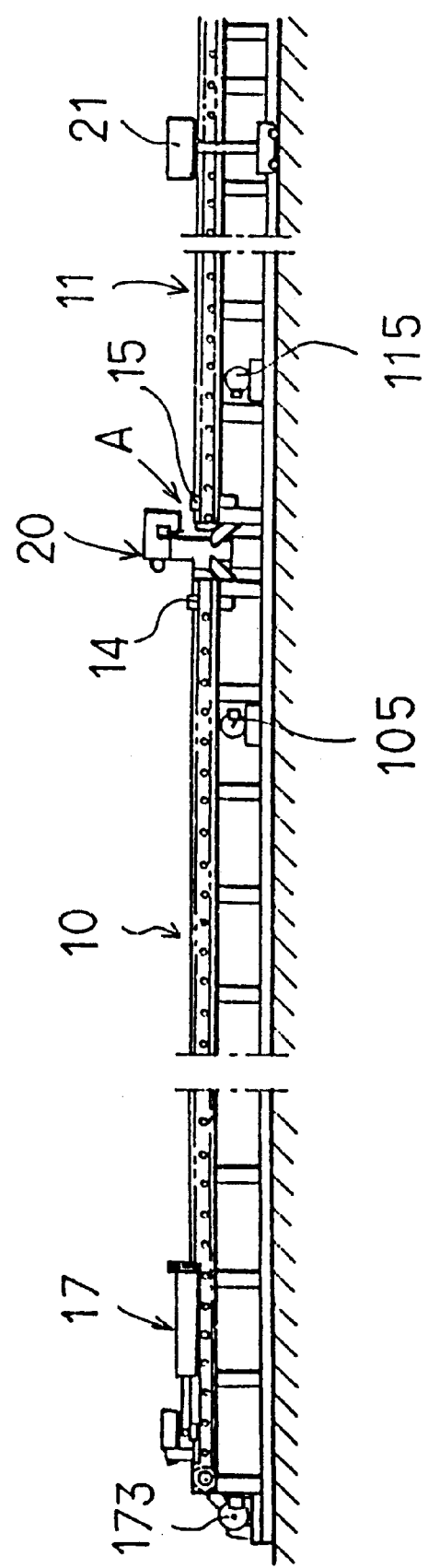
FIG. 1 is a schematic side view showing a sequential feed automatic machining apparatus for long length product according to an embodiment of the present invention.
Figure 2:
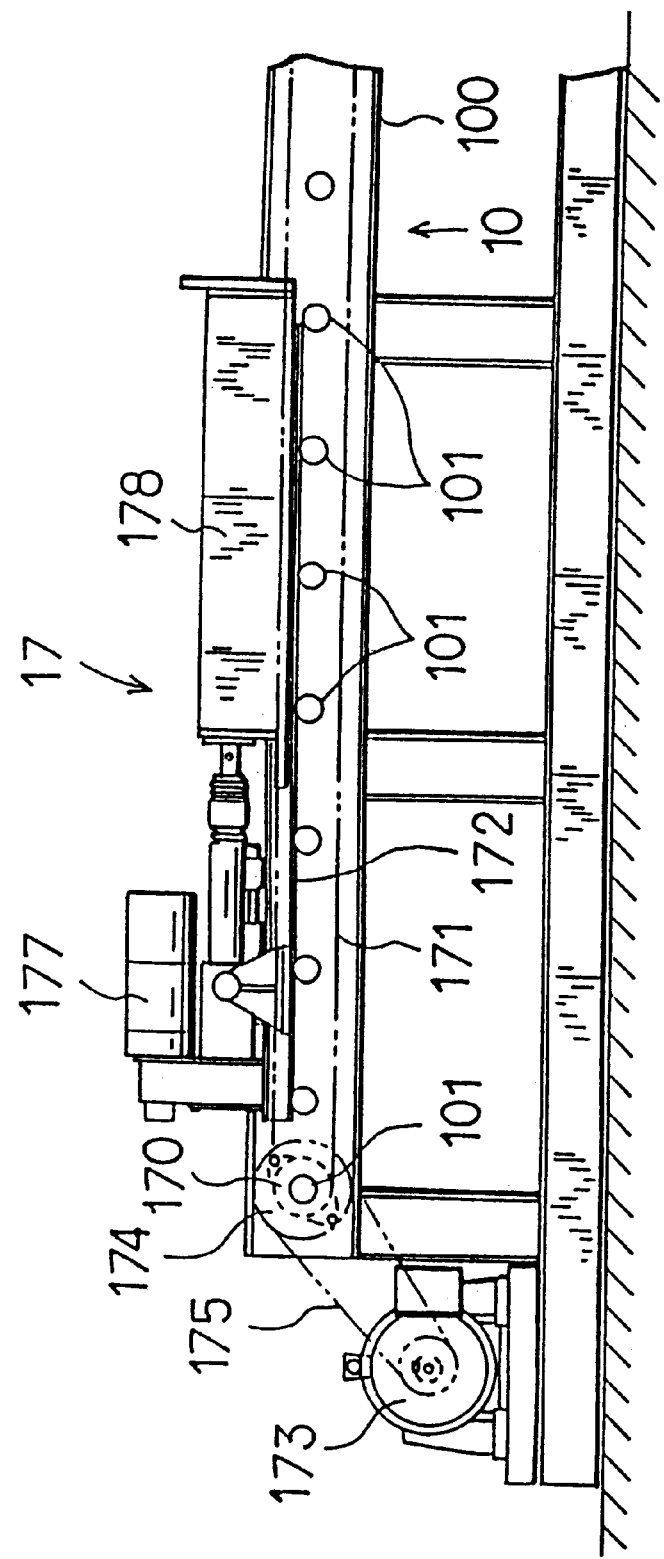
FIG. 2 is a side view showing the construction around the central portion as well as the propulsion mechanism in the apparatus.
Figure 3:
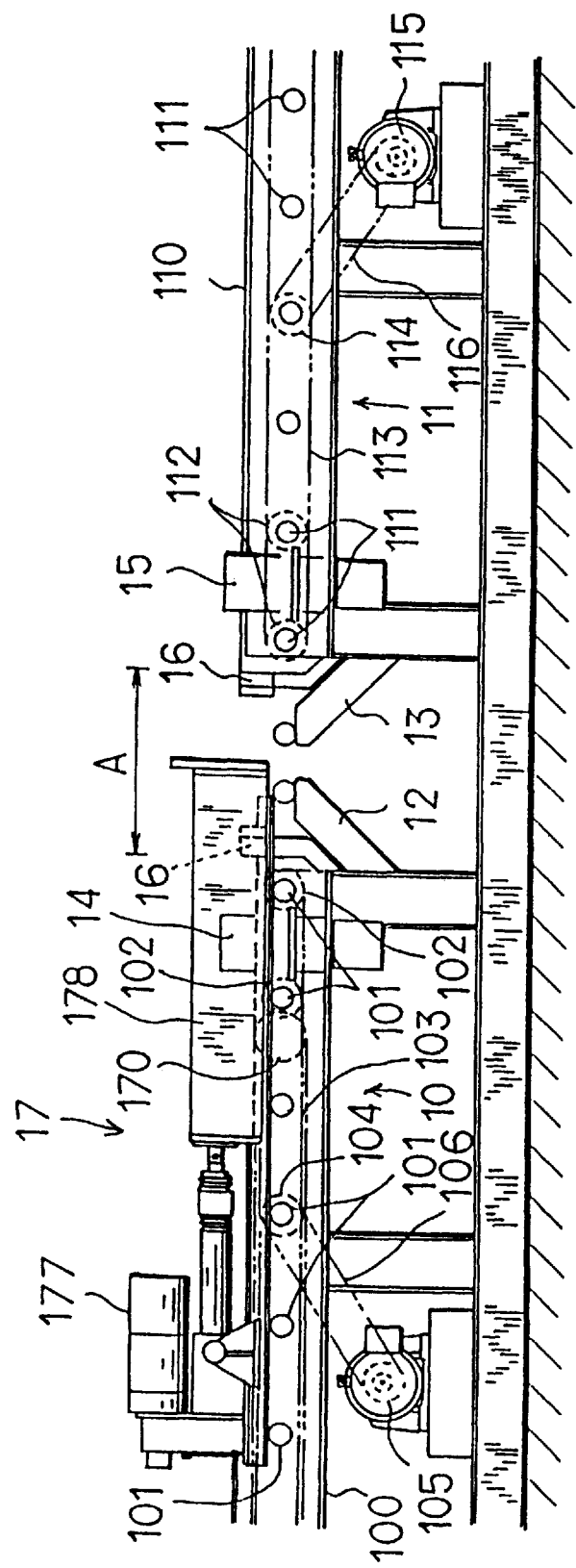
FIG. 3 is a side view showing the construction around the terminal end of the first conveyor line as well as the propulsion mechanism in the apparatus.

Herein below, the present invention will be described in detail based on the embodiments thereof as illustrated in the accompanying drawings. FIGS. 1 through 6 show a sequential feed automatic machining apparatus for long length product according to an embodiment of the present invention. In the drawings, first and second conveyor lines 10, 11 are disposed in straight line on both sides of a machining area A, and intermediate auxiliary rollers 12, 13 are retractably provided between the two conveyor lines 10, 11.

In the first and second conveyor lines 10 and 11, a plurality of conveyor rollers 101, 111 are longitudinally spaced from one another with specified intervals and rotatably held to conveyor frames 100, 110 having specified lengths. For example, the feed-in side first conveyor line 10 can be 15 m and the feed-out side second conveyor line 11 can be 12 m. Out of the plurality of conveyor rollers 101, 111, those at the rear end and the front end as well as some of those in the middle have sprockets 102, 112 attached on both ends and further have drive chains 103, 113 stretched over them.

Each conveyor roller 101, 111 on the starting end side, i.e. the machining area A side of the first conveyor line 10 and on the terminal end side, i.e. the machining area A side of the second conveyor line 11, has a drive sprocket 104, 114 attached thereto. The drive sprockets 104, 114 are connected to the sprockets of transfer motors 105, 115 by chains 106, 116, so that the product W placed on the lines can be transferred along their length.

Figure 4:
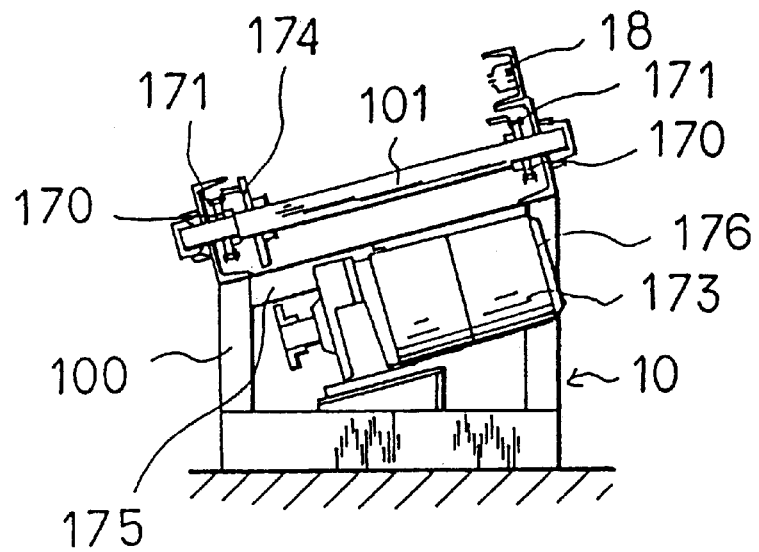
FIG. 4 is an end view showing the front construction of the starting end side or loading side of the first conveyor line.
Figure 5:
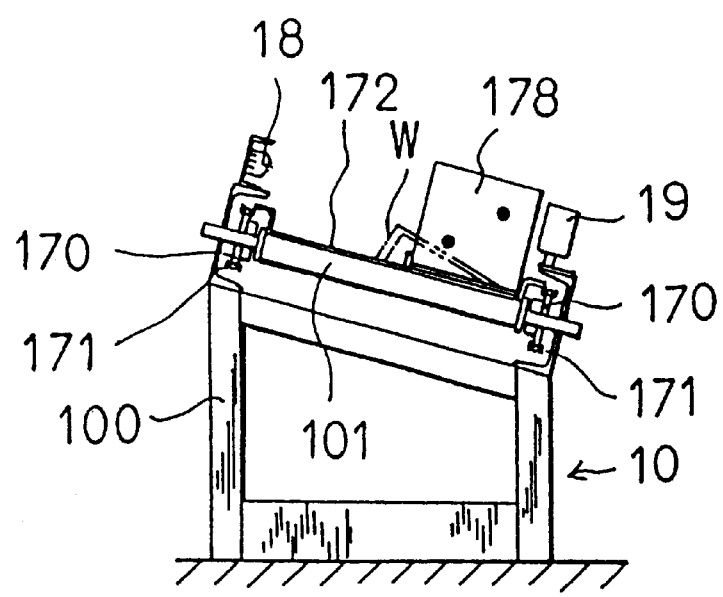
FIG. 5 is a front view showing the relationship between the first conveyor line and the propulsion mechanism.

In the first and second conveyor lines 10, 11, the conveyor rollers 101, 111 are tilted widthwise by a specified angle, for example 15°, with respect to the vertical direction as shown in FIGS. 4 and 5. As a result, the product W placed on the lines will slide downward along the tilted surface by its own weight so as to be aligned widthwise.

The first and second vises 14, 15 are provided in proximity to the machining area A on the terminal end side of the first conveyor line 10 and the beginning of the second conveyor line 11, respectively. These first and second vises 14, 15, although not shown in detail, are fixed at the side that is tilted down, and on the other side, each comprise a pair of widthwise slidable claws and a hydraulic or air cylinder that slides the other claw so that the product W can be gripped and fixed.

The intermediate auxiliary rollers 12, 13 are so constructed that a central part of a link having a front end roller is held to the conveyor frame 100, 110, and the rod of the hydraulic cylinder attached to the conveyor frame 100, 110 is connected to the other end of the link. Thus, the intermediate auxiliary rollers 12, 13 can emerge into the machining area A from below the conveyor lines 10, 11.

Figure 6:
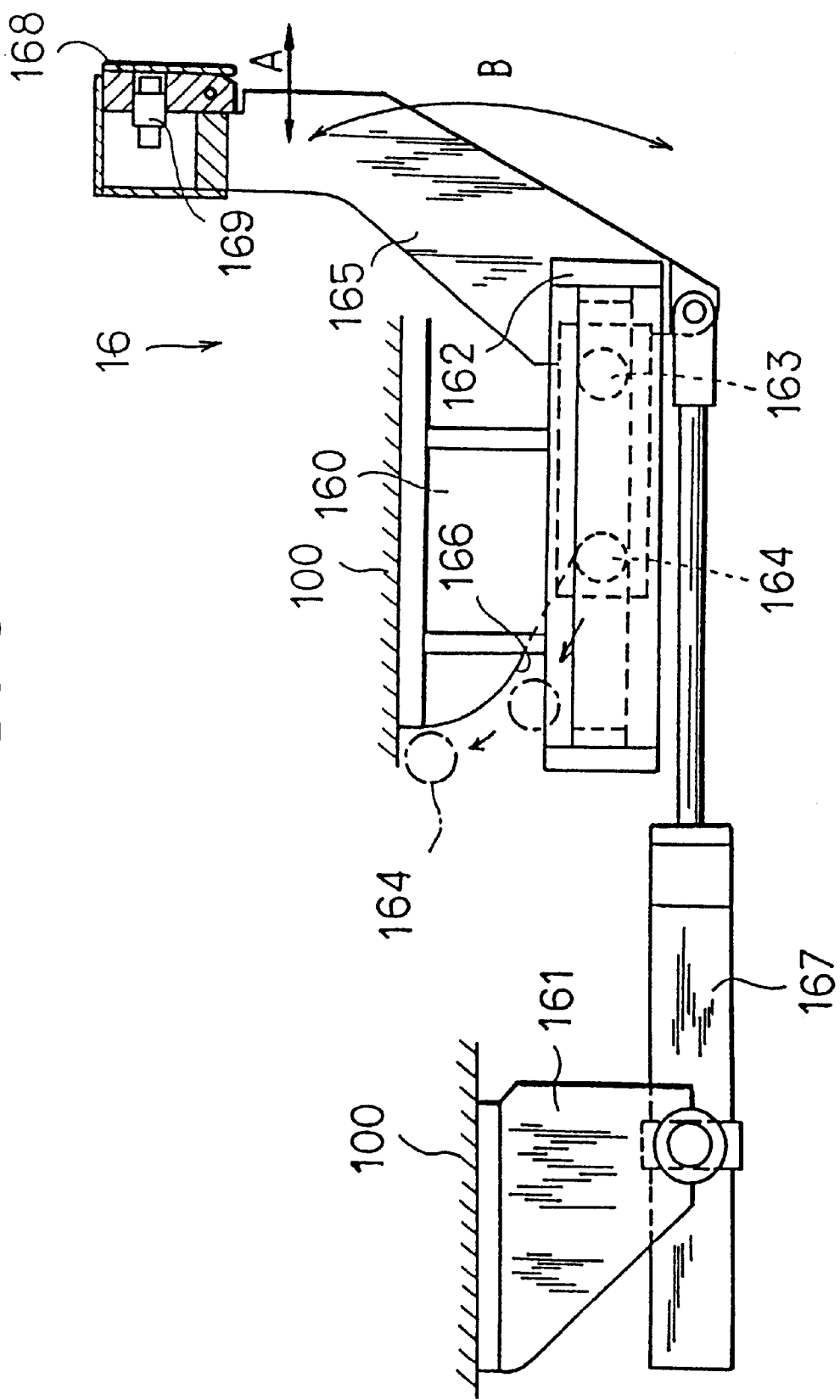
FIG. 6 is an side view showing the stopper in the apparatus.

A stopper 16 is provided in the machining area A. As shown in FIG. 6, a pair of front and rear mounting brackets 160, 161 are attached on the lower surfaces of the conveyor frames 100, 110, while a guide 162 is provided in the front side mounting bracket 160. In the guide 162 is defined a horizontally extending guide recess into which one slide pin 163, 164 is slidably accommodated. The slide pins 163, 164 are attached to the base portion of an arm 165. The upper part of the rear half of the guide recess is opened so that the slide pin 164 can withdraw therethrough. At the rear edge of the mounting bracket 160. is defined a generally arc-shaped guide edge 166 for upwardly guiding the slide pin 164 that has been withdrawn through the guide recess. Thus, the arm 165 is able to exert actions of advancing and retreating in the forward and backward direction while also swinging in the up and down direction (see arrows A and B in FIG. 6).

On the other hand, a hydraulic cylinder 167 is swingably attached to the rear side mounting bracket 161. The rod of the hydraulic cylinder 167 is connected to the lower end of the arm 165 to drive the arm 165. The arm 165 can retreat from the contact position where it has protruded upward of the conveyor lines 100, 110 and within the machining area A toward a retracted position which is below the conveyor lines 100, 110. The arm 165 then swings downward, thus being plungeable without moving the product W into contact therewith. At the end of the arm 165, a positioning member 168 is provided and the positioning member 168 is equipped with a rod for turning a limit switch 169 on and off.

A propulsion mechanism 17 is mounted on the terminal end of the first conveyor line 10. This propulsion mechanism 17, as shown in FIGS. 2 to 5, has propulsion sprockets 170 attached on right and left both ends of the starting end conveyor roller 101 of the first conveyor frame 10 and on the starting end side right and left of the conveyor frame 100. A propulsive chain 171 is stretched between the front and rear propulsion sprockets 170, and both edges of a boat 172 are fixed between the two right and left propulsive chains 171, 171. The boat 172 is placed on the conveyor roller 101.

A drive motor 173 is mounted below the terminal end of the conveyor frame 100, and a drive sprocket 174 is mounted to the rotating shaft of the drive motor 173. The drive sprocket 174 is coupled with the starting end side propulsive sprocket 170 by a chain 175. A rotary encoder 176 is mounted on the drive motor 173 so that the propulsion distance can be computed from the number of revolutions of the motor.

A power cylinder 177 is mounted on the boat 172 by brackets, and the power cylinder 177 transfers the rotation of the brake equipped motor to the ball and screw with the speed reduced by gears to thereby stroke the rod. Besides, it contains a propulsive force detection spring unit which comprises, in combination, two types of prepressed conical disc springs with different spring constants and a limit switch so that any shocks given to the rod can be absorbed and so that the rod can be held in a specified stroke position.

A pushing bar 178 is mounted on the boat 172, and fixed at the end of the rod of the power cylinder 177. An oilless bushing is interposed between the pushing bar 178 and the boat 172 so that the pushing bar 178 is slidable.

A trolley duct 18 is mounted at an upper edge of the conveyor frame 100 on the upper side of its tilt, over the entire longitudinal length, so that the power cylinder 173 can be powered via the trolley. A substantially upright auxiliary roller 19 is provided at an upper edge of the conveyor frame 100 on the lower side of its tilt so that it supports the upper part of the large size product W aligned widthwise by its own weight.

A machining robot 20 is provided in proximity to the machining area A. The machining robot 20 has a plasma torch at the front end of its arm that is movable in the three (XYZ) directions. A controller 21 is implemented by a microcomputer, and drives and controls the first and second conveyor lines 10, 11, the intermediate auxiliary rollers 12, 13, the first and second vises 14, 15, the stopper 16, the propulsion mechanism 17, and the machining robot 20.

Figure 7:
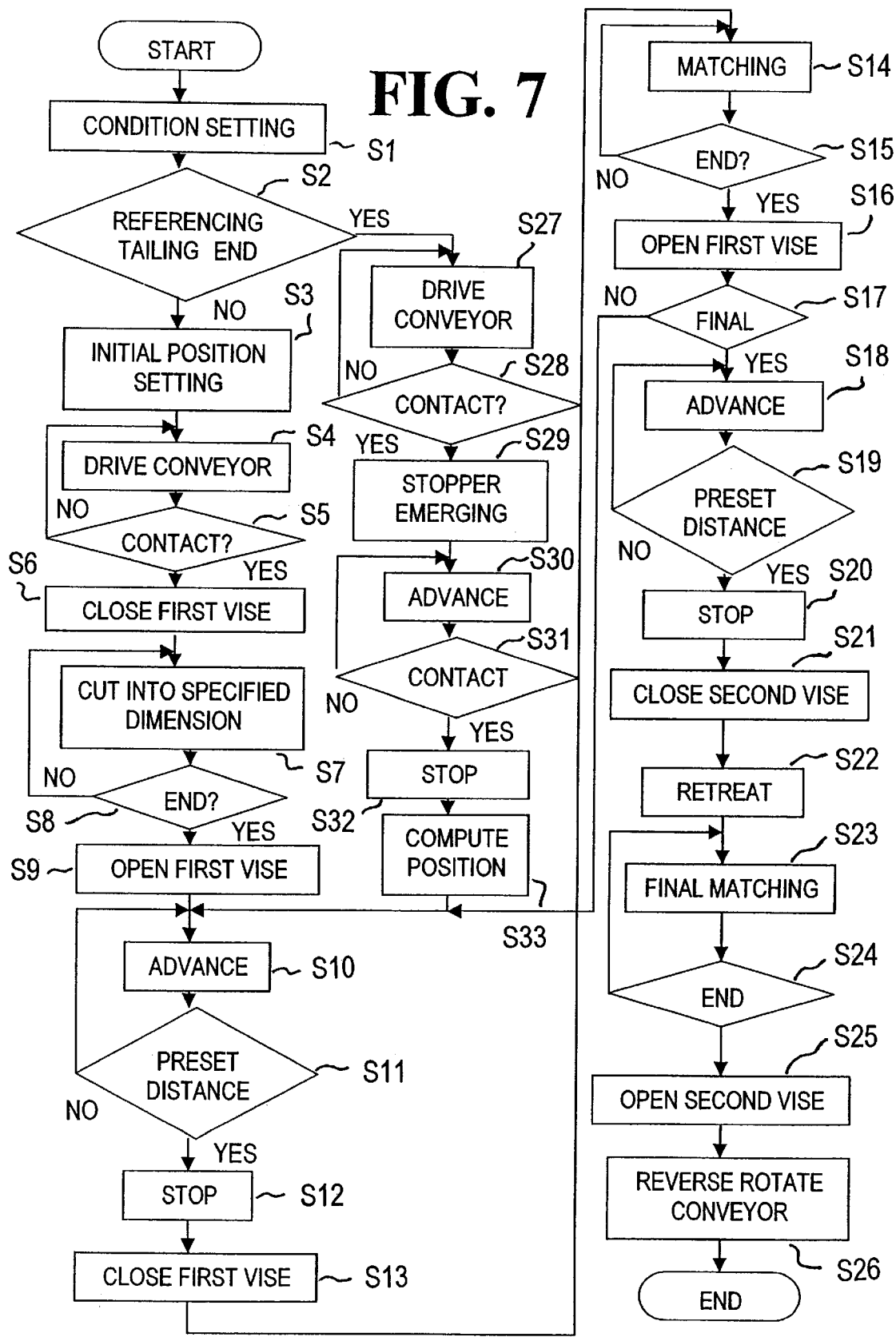
FIG. 7 is a flow chart diagram showing the processing flow of the controller in the apparatus.

Next, the process of machining is explained with reference to FIG. 7. FIG. 7 shows the flow of computation processes in the controller. For sequentially feeding and machining a long product W such as shaped steel, the controller 21 is first turned on, and conditions are set in the controller 21 corresponding to the product W (step S1). The conditions include specifying whether or not the machining reference is the tailing end or leading end of the product, the initial position of the propulsion mechanism 17, the machining position of the product, and the type of the machining.

Subsequently, when the product W is placed on the second conveyor line 11, the system is activated. Then if the machining reference is for the tailing end of the product, the propulsion mechanism 17 is moved to the initial position, in which state the first and second conveyor lines 10, 11 are driven (steps S2, S3). The product W is transferred toward the terminal end of the first conveyor line 10. When the product W comes into contact with the pushing bar 178 of the propulsion mechanism 17, the tailing end of the product W can be positioned at the initial position. Then, the product W is gripped by the first vise 14 and the machining robot 20 operates to cut off the leading end side of the product W. Thus, the product W is made to the specified dimension (steps S4 to S8).

With the product W machined into the specified dimension, the first vise 14 is opened and the propulsion mechanism 17 propels the product W forward (step S10). In this process, because the product W is normally kept in contact with the pushing bar 178 by the conveying force of the first conveyor line 10, it can be advanced with high precision. The leading end side of the product W is then fed toward the second conveyor line 11. With the product W advanced to a predetermined distance, the propulsion mechanism 17 is stopped from advancing (steps S11, S12), whereas the product W is subject to the conveying force of the first and second conveyor lines 10, 11 so that the product W will not advance further by its inertia, but will stop correctly at the desired position.

Coming to a stop, the product W, is gripped by the first vise 14, in which state the machining robot 20 performs the required machining process that have been input to the controller 21, such as cutting, boring, notching, or welding (steps S13 to S15). Likewise, according to the conditions input to the controller 21, the operations of opening the first vise 14, advancing and stopping, gripping by the first vise 14, and machining are continued, by which the intermediate part of the product W is machined (steps S10 to S17).

After the intermediate machining of the product W, when the trailing end of the product W becomes the next site to be machined, the propulsion mechanism 17 is now an obstacle for the gripping operation of the first vise 14. Therefore, the propulsion mechanism 17 in turn is advanced so that most of the trailing end side of the product W is fed to the second conveyor line 11. The trailing end of the product W is set within the machining area A, and the propulsion mechanism 17 is stopped (steps S18 to S20). With the propulsion mechanism 17 stopped, the product W is gripped by the second vise 15 on the second conveyor line 11, and the propulsion mechanism 17 retracts (steps S21, S22). When the machining process is to be iterated under the same conditions, the propulsion mechanism 17 is preferably retracted to the initial position. Finally, the trailing end of the product W is subjected to the machining process input to the controller 21. Then, the second vise 15 is opened, while the second conveyor line 11 is rotated reverse, so that the product W is fed out (steps S23 to S26).

In the case where the machining is carried out by referencing the trailing end of the product W without setting the initial position of the propulsion mechanism 17, the first and second conveyor lines 10, 11 are driven so that the product W is first brought into contact with the propulsion mechanism 17. Thereafter, the stopper 16 on the second conveyor line 11 protrudes into the machining area A (steps S27 to S29).

Next, the propulsion mechanism 17 is advanced so that the leading end of the product W is brought into contact with the stopper 16, and thereafter the stopper 16 is plunged inward. Then, since the correct position of the stopper 16 is previously known, the leading end of the product W can be positioned. With this position taken as the initial position, the machining target position input to the controller 21 is corrected. Subsequently the intermediate machining processes and the final machining processes are carried out by referencing the determined initial position (steps S10 to S26). In this case, the sequential feed automatic machining may be applied not only to product W which is longer than the specified dimension but also a product W shorter than the specified dimension. However, in the case of a product W that is shorter than the specified dimension, the final machining process would result in a fault but otherwise the machining process can be carried out as previously set.

Figure 8:
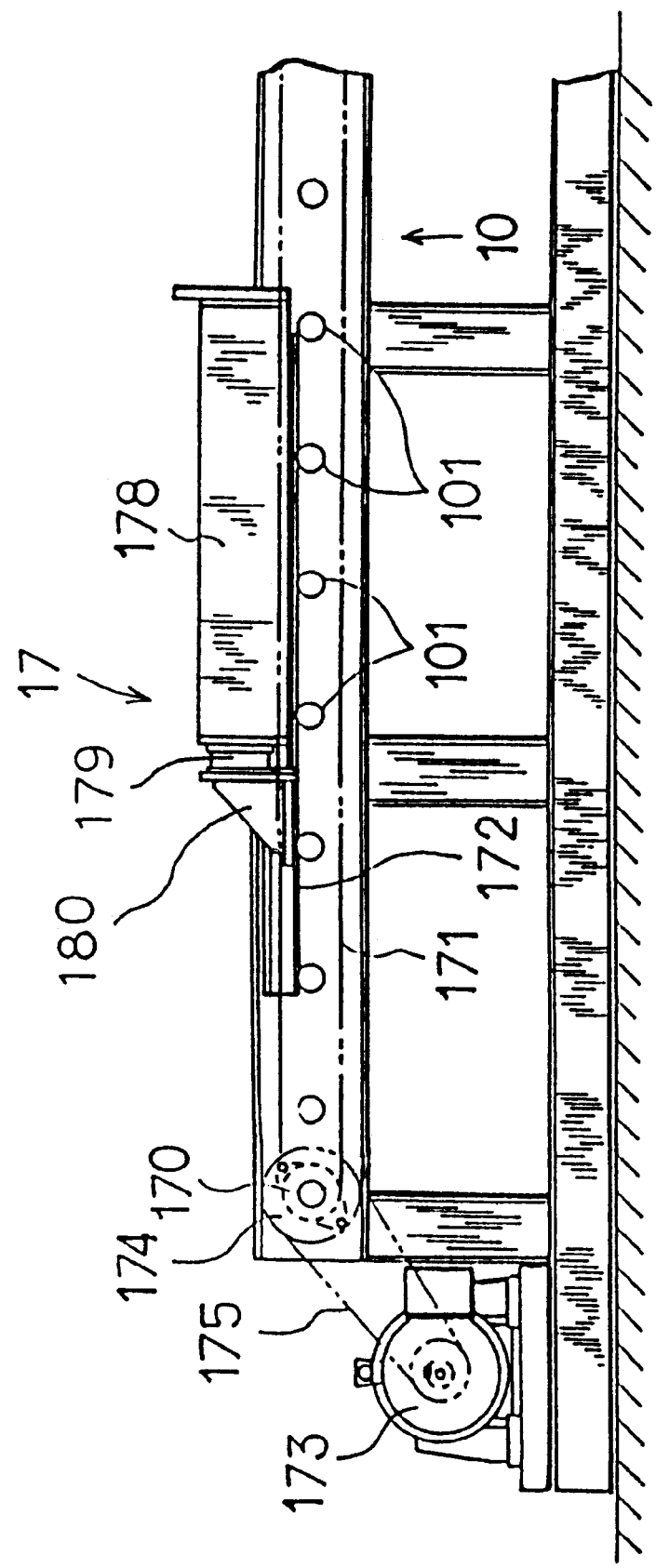
FIG. 8 is a partial side view showing a second embodiment of the present invention.

FIG. 8 shows a second embodiment of the present invention where the propulsion mechanism 17 is modified. In the foregoing embodiment, the power cylinder 177 is mounted on the propulsion mechanism 17 for the absorption of shocks due to contact with the product W and during positioning of the product W. However, with this arrangement, the cost would increase since the trolley duct 18, which is the power supply equipment for the power cylinder 177, as well as a U-shaped channel for mounting the trolley duct 18 are required, result in a complicated construction. This being the case, the pushing bar 178 is supported by a bracket 180 with a relatively hard rubber 179 interposed therebetween. This assembly is attached to the boat 172 in order that shocks due to the contact with the product W will be absorbed and, further the hard rubber 179 will be restored to its original state so that the product W can be positioned with a high degree of precision.

Therefore, according to the present invention, products having a long length can be transported and carried in from steel manufacturers or the like, and while they are being cut, they can be subjected to desired machining processes. This eliminates the need of first cut the product and thereafter machine it as would be involved in the prior art. Thus, the efficiency of the apparatus can be dramatically improved so as to reduce the working time and, as a result, significant cost reduction for the operation can be realized.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

What is claimed is:

1. A method for sequentially feeding and automatically machining products having a long length, wherein first and second conveyor lines each have a vise located in proximity to a machining area so that the product may be automatically machined at preset sites in succession, said method comprising the steps of:

machining a leading end of the product comprising the steps of:
        moving a propulsion mechanism to a preset initial position on the first conveyor line,
        transferring the product toward the propulsion mechanism located on the first conveyor line,
        gripping the product by the first conveyor line vise; and
        cutting a leading end side of the product to a specified dimension;
    machining an intermediate portion of the product comprising the steps of:
        releasing the grip by the first conveyor line vise;
        advancing the product to a preset distance by the propulsion mechanism against a conveying force of the first conveyor line so that the part of the product machined in said step of cutting is fed to the second conveyor line while a to be machined target site of the product is moved within the machining area, gripping an unmachined part of the product by the first conveyor line vise, and performing a preset machining process on the to be machined target site of the product; and machining a final portion of the product comprising the steps of:

feeding a tailing end of the product into the machining area by the propulsion mechanism against the conveying force of the second conveyor line, gripping the work by the second conveyor line vise, retracting the propulsion mechanism; and performing a preset final machining process.

2. A method as defined in claim 1, further comprising the step of:

performing additional machining in the intermediate portion of the product by machining additional to be machined target sites of the product.

3. A method for sequentially feeding and automatically machining products having a long length, wherein first and second conveyor lines each have a vise located in proximity to a machining area so that the product may be automatically machined at preset sites in succession, said method comprising the steps of:

protruding a stopper into the machining area, advancing the product by the propulsion mechanism against a conveying force of the first conveyor line until the product comes into contact with the stopper so as to plunge the stopper, thereby taking the resulting position of the product leading end as the initial position;

machining an intermediate portion of the product comprising the steps of:

advancing the product to a preset distance by the propulsion mechanism by referencing the initial position against a conveying force of the first conveyor line so that a part of the product previously machined is fed to the second conveyor line while a to be machined target site of the product is moved within the machining area, gripping an unmachined part of the product by the first conveyor line vise, and performing a preset machining process on the to be machined target site of the product; and machining a final portion of the product comprising the steps of:

feeding a tailing end of the product into the machining area by the propulsion mechanism against the conveying force of the second conveyor line, gripping the work by the second conveyor line vise, retracting the propulsion mechanism; and performing a preset final machining process.

4. A method as defined in claim 1, further comprising the step of:

performing additional machining in the intermediate portion of the product by machining additional to be machined target sites of the product.

* * * * *